May 1, 1934.  W. STELZER  1,956,934

POWER TRANSMISSION MECHANISM

Filed Aug. 3, 1931  4 Sheets-Sheet 1

INVENTOR.
William Stelzer.
BY McConkey & Smith
ATTORNEY.

May 1, 1934.  W. STELZER  1,956,934
POWER TRANSMISSION MECHANISM
Filed Aug. 3, 1931  4 Sheets-Sheet 2
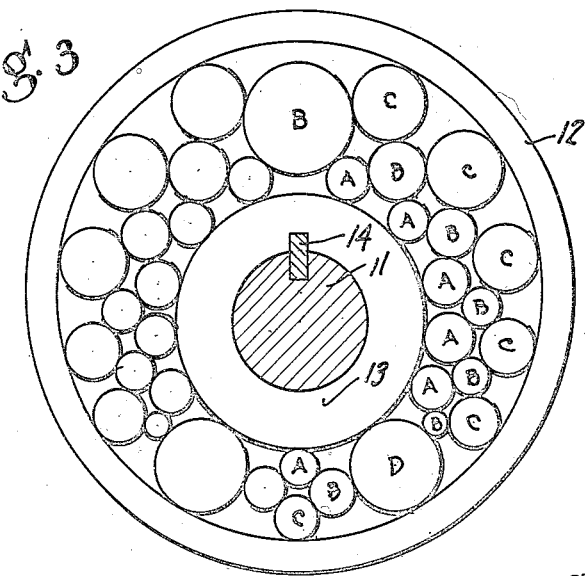
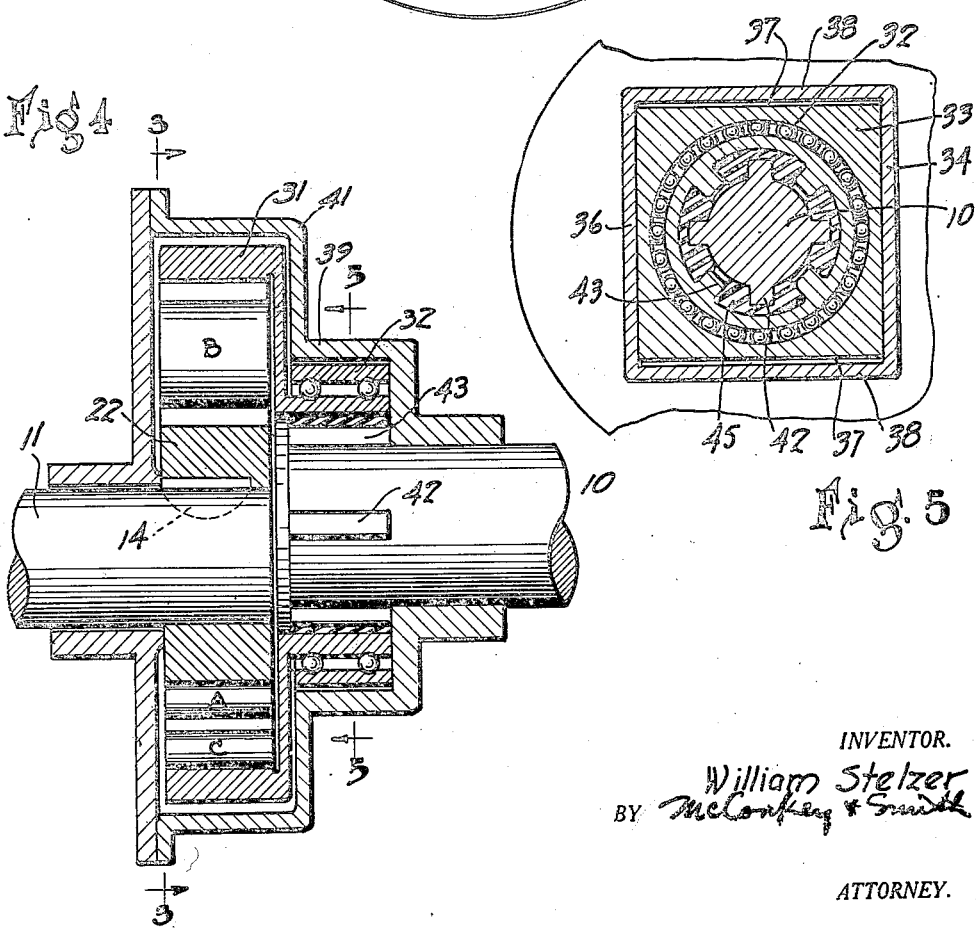
INVENTOR.
William Stelzer
BY McConkey & Smith
ATTORNEY.

May 1, 1934.  W. STELZER  1,956,934
POWER TRANSMISSION MECHANISM
Filed Aug. 3, 1931  4 Sheets-Sheet 3
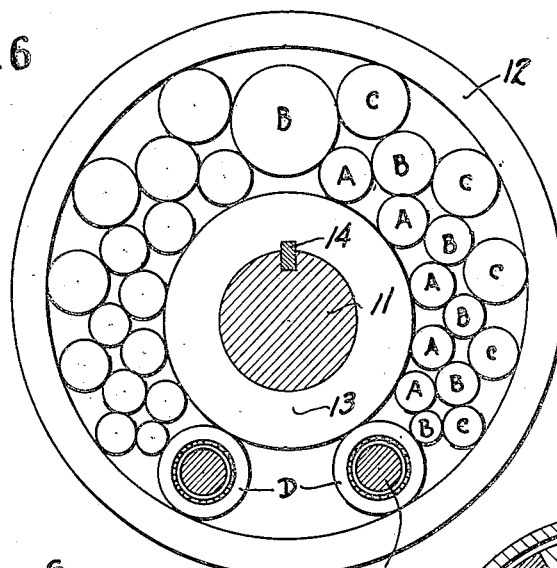
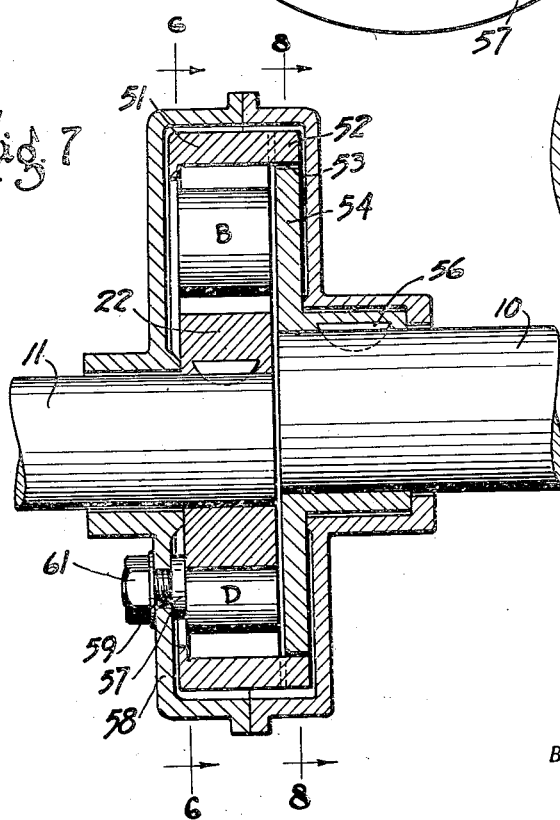
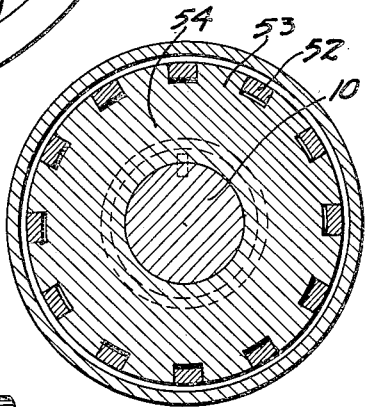
INVENTOR.
William Stelzer
BY McConkley + Smith
ATTORNEY.

May 1, 1934.                    W. STELZER                    1,956,934
                        POWER TRANSMISSION MECHANISM
                    Filed Aug. 3, 1931          4 Sheets-Sheet 4

INVENTOR.
William Stelzer
BY
McConkey & Smith ATTORNEY.

Patented May 1, 1934

1,956,934

UNITED STATES PATENT OFFICE 1,956,934

POWER TRANSMISSION MECHANISM

William Stelzer, South Bend, Ind., assignor to Bendix Research Corporation, South Bend, Ind., a corporation of Indiana Application August 3, 1931, Serial No. 554,691

8 Claims. (Cl. 74—26)

This invention relates to transmission gear mechanisms, and more particularly to roller gear mechanisms of the friction type.

An important object of the invention is to provide a roller gear mechanism in which all rollers act to transmit driving torque.

Another object of the invention is to provide a roller gear transmission in which there is no necessity for accurate positioning of the driving and driven shafts relative to each other.

Another object of the invention is to provide a roller gear transmission in which the driving and driven shafts need not be rigidly supported.

Another object of the invention is to provide a roller gear transmission which is operable with rollers of variable diameter and in which no great care need be used in securing accurate roller dimensions.

Another object of the invention is to provide a roller gear transmission in which the driving and driven shafts may be radially offset.

Other objects and features of the invention will be apparent from the following description in connection with which certain embodiments of the invention have been illustrated in the accompanying drawings in which:

Figure 3 is a transverse cross section of a somewhat different form of the invention taken along the lines 3—3 of Figure 4;

Figure 4 is a longitudinal cross section of the form shown in Figure 3;

Figure 5 is a sectional view showing the resilient mounting of the driving shaft taken along the lines 5—5 of Figure 4;

Figure 6 is a transverse sectional view of another form of the invention taken along the lines 6—6 of Figure 7;

Figure 7 is a longitudinal sectional view of the form shown in Figure 6;

Figure 8 is a fragmental sectional view taken along the lines 8—8 of Figure 7;

The present invention is particularly adaptable to transmission shafts which are axially offset or adapted to be so positioned. The transmission in some of its embodiments is characterized by having the adjacent end of the shafts terminating in circular portions that are arranged eccentrically and in overlapping relation. The space between the overlapping portions or races is substantially filled with a number of rollers or balls which may be of any suitable size, and preferably at least one of which bridges the space between the eccentrically arranged inner and outer races and has a diameter greater than the narrowest space between them. The rollers or balls are preferably arranged in two similar groups on opposite sides of the inner race, but this arrangement is not essential to the operation and other arrangements may be used if desired. The wedging or driving action of the rollers is produced by a slight movement of the shafts toward a concentric position, it being well known that more rollers or balls can be positioned between two eccentric races than between two concentric ones, the phenomenon being similar to that encountered in the measuring of commodities of substantial size with containers of different capacities, for instance, it is well known that the weight of four peck measures of potatoes is less than the weight of a bushel of potatoes measured in a single container of that capacity.

Figure 1:
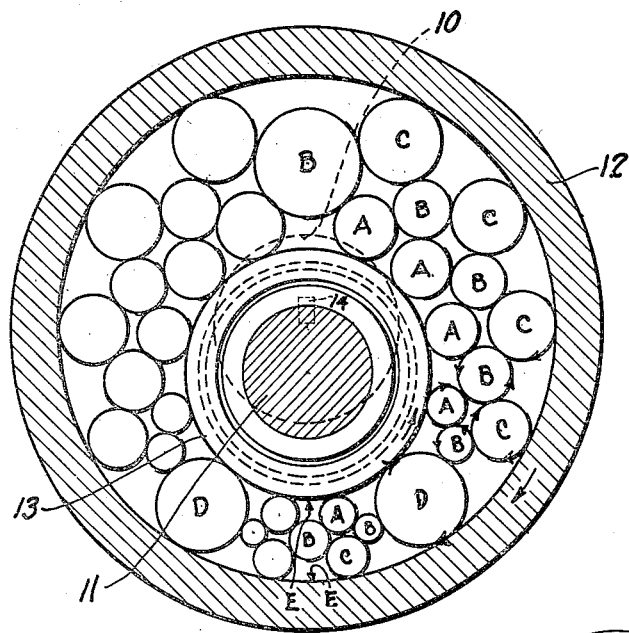
Figure 1 is a transverse cross section of the improved transmission taken on lines 1—1 of Figure 2.
Figure 2:
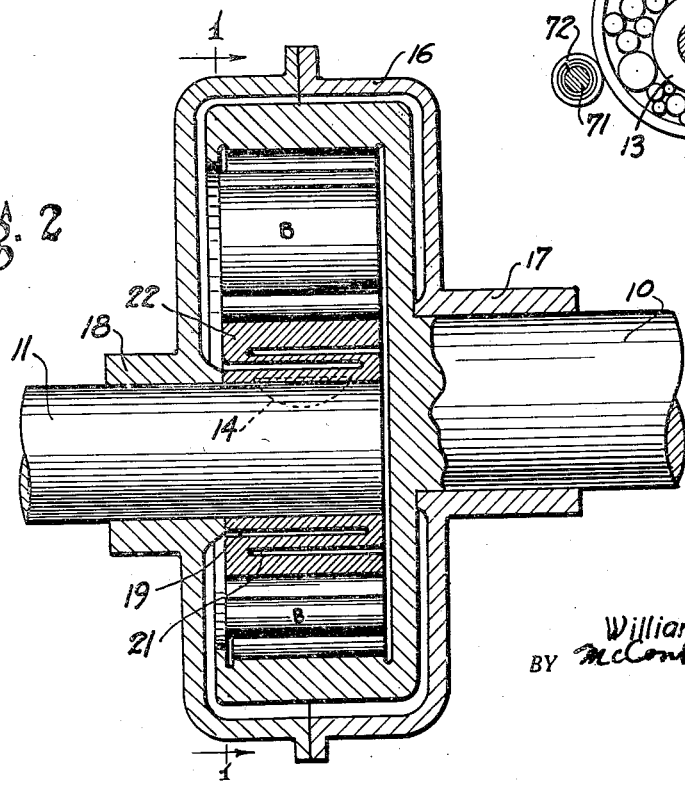
Figure 2 is a longitudinal cross section of the form shown in Figure 1.

Referring to the drawings and particularly to Figures 1 and 2, the driving shaft, for convenience, is designated as 10 and the driven shaft as 11, although this arrangement may be reversed with equal satisfaction. Shaft 10 terminates in a circular race 12 within which it is eccentrically arranged with respect to an inner face 13 secured to the driven shaft 11 by key 14. A housing 16 encloses both races and is provided with bearings 17 and 18 for the driving and driven shafts respectively. The hub 22 of inner race 13 is preferably formed with axially extending slits 19 and 21 which permit slight radial movement of the race whereby it may move from its original eccentric position with respect to the outer race. The space between the inner and outer races 12 and 13 is preferably filled with three series of rollers of such size, that in the normal eccentric position no substantial radial pressure is exerted from the inner to the outer race.

The inner rollers designated A contact only with the inner race and the median series of rollers B, while rollers C contact only with the outer race and the median rollers B. Additional rollers D are also positioned between the races and contact directly with both races and rollers B, the diameter of rollers D being preferably greater than the narrowest distance between the inner and outer races represented by EE.

In the operation of the device, if the direction of the driving shaft 10, and outer race 12 be clockwise as shown by the arrow in Figure 1, roller D is moved slightly toward the narrowest part of the space, and because of resilient hub 22 the inner race will move a slight distance in a vertical direction or toward a concentric position. The slight movement thus obtained wedges the rollers between the inner and outer race and each acts as a driving member to rotate the driven shaft 11 at a speed equal to the ratio of the driving races; that is the driven shaft 11 is rotated at a greater speed than the driving shaft 10. If the load should be increased the wedging action is also increased, and at all times the pressure of the rollers will be sufficient to rotate the driven shaft at the predetermined speed ratio. It will be noted that the pressure of the rollers is proportional to the torque reaction, and that in the idle position the pressure on the races drops to substantially zero. As three series of rollers are used and the additional rollers D contact directly with both the inner and outer races, the contacting surfaces of all members will rotate in the same direction and the direction of rotation of the driven shaft will be the reverse of the driving shaft.

In the form of the invention shown in Figures 3, 4 and 5, the arrangement of the shafts and rollers is substantially the same as in the form of the invention shown in Figures 1 and 2, but in this form of the invention the resilient hub of the inner race has been omitted, and the outer race 31 is mounted in a bearing 32 which is movable in a vertical direction toward a concentric position. The bearing 32 is preferably mounted in a block 33 which is slidably mounted in guides 34 and 36 whereby it may move vertically a slight distance as indicated by the clearance space 37 between the blocks 33 and the end portions 38 of the rectangular enclosure 39 which forms a part of the main gear housing 41. In this form of the invention a resilient connection is preferably incorporated between the driving shaft 10 and the outer race 31 which includes outwardly extending tongues 42 formed on the driving shaft and inwardly extending tongues 43 on the outer race each of which engages a resilient ring 45 formed of any suitable material such as rubber or fiber.

In the form of the invention shown in Figures 3, 4 and 5 the operation of the gear is substantially the same as that of the form shown in Figures 1 and 2, except that in this form the inner race is immovable with respect to the housing and the outer race is adapted to move slightly toward a concentric position and wedge the rollers into driving contact as the torque is increased.

In the form of the invention shown in Figures 6, 7 and 8 both the driving shaft 10 and driven shaft 11 are immovable in a radial direction with respect to the housing and the outer race 51 is slightly movable in a radial direction with respect to the inner race by means of projections 52 formed on the race which interlock with similar projections 53 formed on flange 54 secured to driving shaft 10 by key 56. In this form of the invention rollers D are pivotally mounted on studs 57 that are secured to the housing 58 by threaded projections 59 and nuts 61. In this form of the invention rollers D are preferably loosely mounted on studs 57 in order that they may move slightly to force outer race 51 toward a concentric position and wedge the rollers into driving contact with the surfaces of the races.

Figure 9:
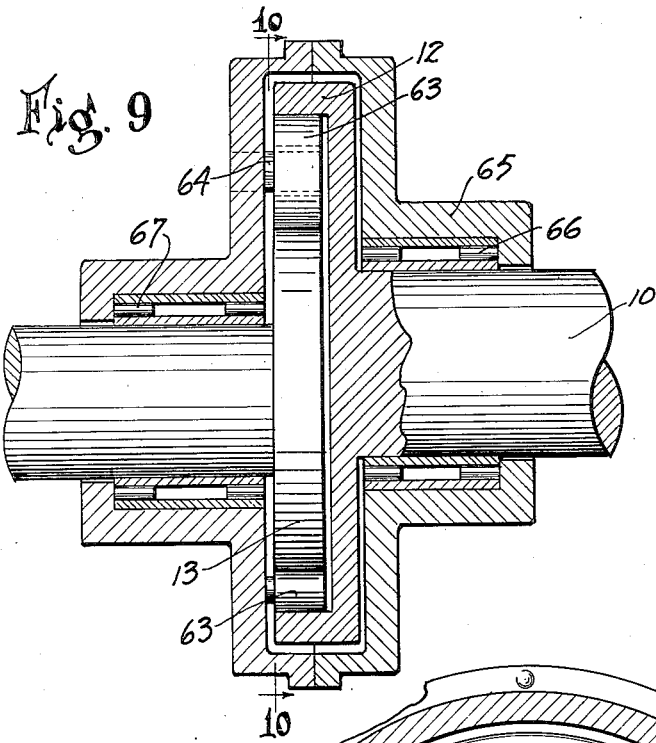
Figure 9 is a longitudinal cross section of still another form of the invention.
Figure 10:
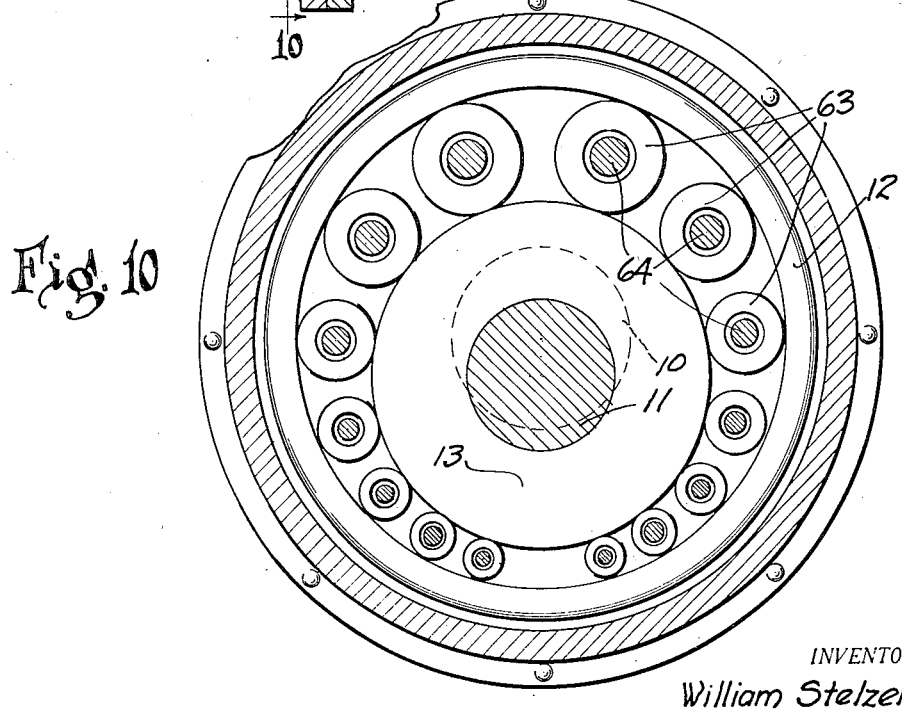
Figure 10 is a transverse sectional view taken along the lines 10—10 of Figure 9.

In the form of the invention shown in Figures 9 and 10 a single series of rollers has been used which are of gradually increasing size and bridge the space between the eccentric races. In this form of the invention the adjacent faces of adjoining rollers 63 rotate in opposite directions and it is therefore desirable to space the rollers from each other. The rollers are therefore loosely mounted on individual studs 64 whereby a spaced relation is maintained between the adjacent faces of the rollers. The action of spacing studs 64 is similar to the well known cage used in ball bearing constructions, and if desired, this form of spacer may be substituted for the studs used herein. In this form of the invention the driving and driven shafts 10 and 11 are rotatively mounted in housing 65 by bearings 66 and 67, either of which may, if desired, have a slight radial clearance to permit movement of the races toward a concentric position.

Figure 11:
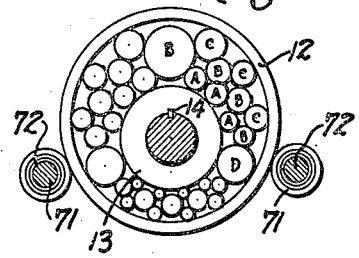
Figure 11 is a transverse sectional view of a further form of the invention.

In Figure 11 there is illustrated a form of the invention in which the torque reaction is taken by rollers 71 which contact with the exterior surface of outer race 12, the rollers being rotatively mounted on studs 72 which are secured to any suitable support not shown. In this form of the invention it is not necessary to locate the races by a housing and the shafts may be unsupported except for the torque reaction rollers 71.

While various embodiments of the invention have been illustrated and described, it is understood that this showing and description are illustrative only, and that the invention is not regarded as limited to the forms shown and described, or otherwise, except by the terms of the following claims.

I claim:

1. A transmission mechanism comprising eccentrically arranged inner and outer circular members, means for resiliently supporting one of said members, a series of rollers between said members adapted to substantially bridge the space between the members in the idle position of the members, and all of said rollers being freely movable in all directions lying in the plane of the rollers to completely bridge the space when the members are moved toward a concentric position, at least one of said rollers having a diameter greater than the shortest distance between the eccentric members.

2. A transmission mechanism comprising a pair of eccentrically supported circular races, a plurality of rollers all of which have translatory movement therebetween including a roller contacting the inner race, a roller contacting the outer race, a roller contacting both inner and outer race-contacting rollers, and a roller contacting both inner and outer races arranged to be moved relative to both races to decrease the eccentricity thereof in response to a load on the mechanism, said last named roller being positioned between the races by the coaction of the other rollers.

3. A transmission mechanism comprising a pair of eccentrically supported circular races defining a crescent-shaped annulus, a plurality of rollers all of which have translatory movement therein including a roller contacting the inner race, a roller contacting the outer race, a roller contacting both inner and outer race-contacting rollers, and a roller contacting both inner and outer races having a diameter intermediate the narrow and wide widths of the annulus.

4. A transmission mechanism comprising a pair of eccentrically arranged races, and a plurality of varying size rollers interposed therebetween adapted to wedge between the races and transmit driving torque from one race to the other, at least one of said rollers having a diameter less than the mean radial distance between the races, and greater than the least radial distance between them, all of said rollers having translatory movement between the races during the wedging movement.

5. A transmission mechanism comprising a pair of eccentrically arranged races, a plurality of rollers interposed therebetween, one of said races having a radially movable bearing whereby the race is movable relative to the other race for frictionally gripping the rollers between the races, and means including a slidable block for restricting the bearing to a movement in a single radial line.

6. A transmission mechanism comprising a pair of eccentrically arranged races, a plurality of rollers interposed therebetween, the outer of said races having a radially movable bearing whereby the race is movable relative to the other race for frictionally gripping the rollers between the races, and means including a slidable block for restricting the bearing to a movement in a single radial line.

7. A transmission mechanism comprising a pair of eccentrically arranged races, a plurality of rollers interposed therebetween, a housing enclosing the races, and means restricting the axis of one race to move in a single radial line with respect to the housing for decreasing the eccentricity of the races.

8. A transmission mechanism comprising a pair of eccentrically arranged races, a plurality of rollers interposed therebetween, a housing enclosing the races for supporting the outer race, and means restricting the axis of said outer race to move in a single radial line with respect to the housing for decreasing the eccentricity of the races.

WILLIAM STELZER.